Aug. 12, 1969   J. A. TANKERSLEY   3,460,628
LAMINATED TENSION-TORSION TIE-BAR
Filed Nov. 6, 1961
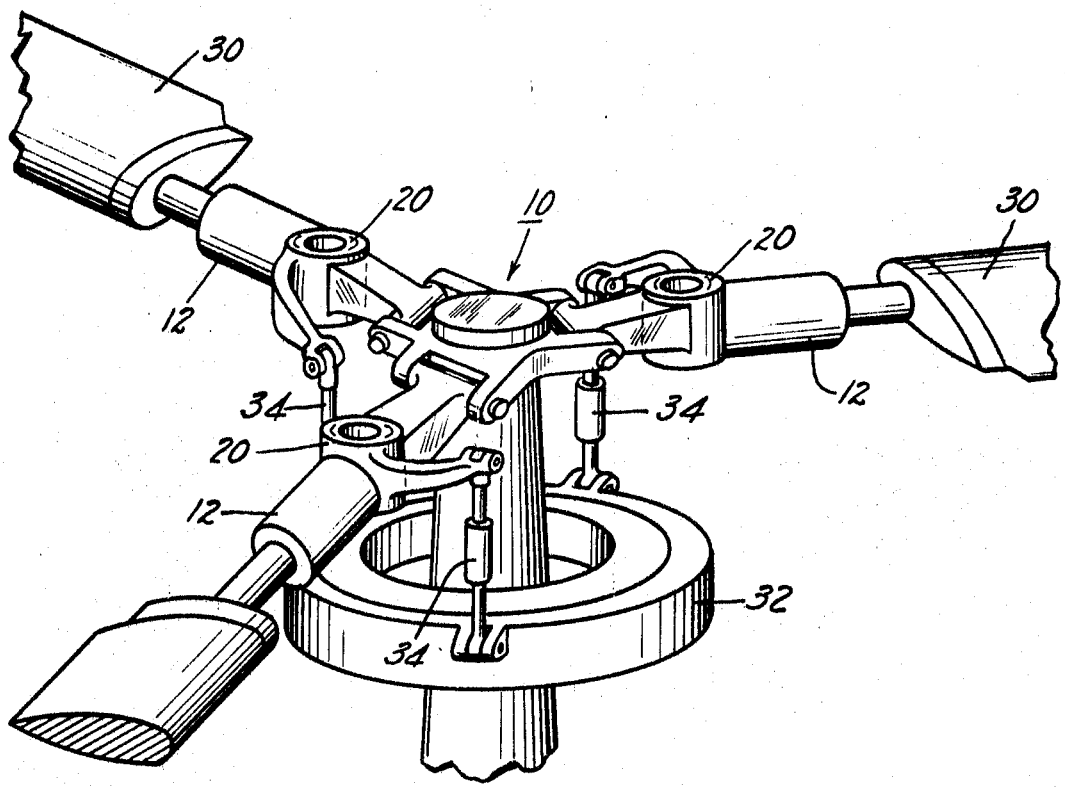
FIG_1
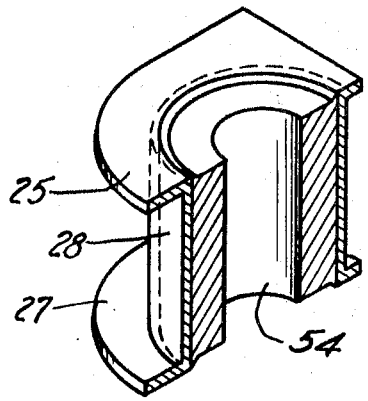
FIG_6
INVENTOR.
JAMES A. TANKERSLEY.
BY
ATTORNEY.

Aug. 12, 1969     J. A. TANKERSLEY     3,460,628
LAMINATED TENSION-TORSION TIE-BAR
Filed Nov. 6, 1961     5 Sheets-Sheet 2
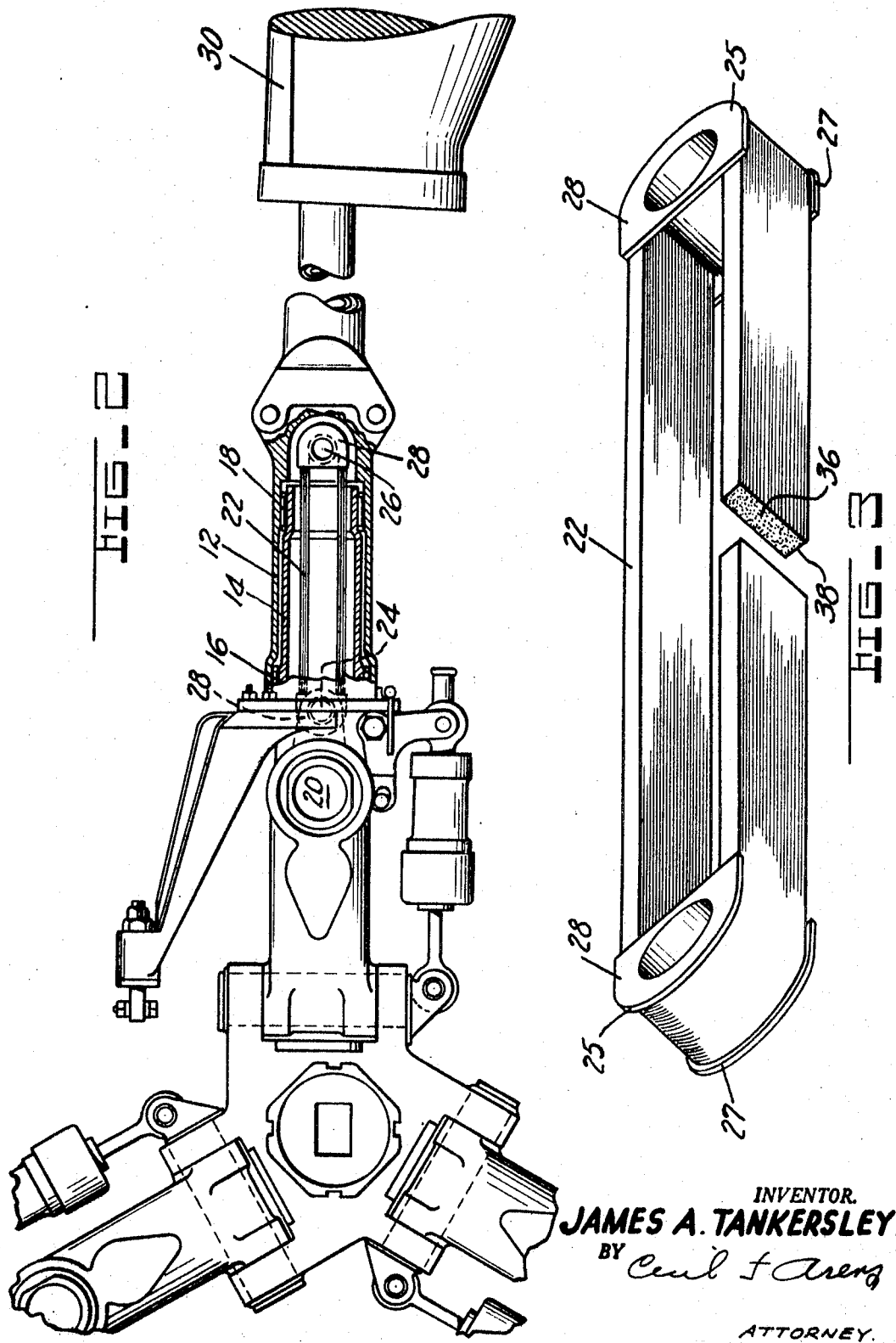
INVENTOR.
JAMES A. TANKERSLEY.
BY
ATTORNEY

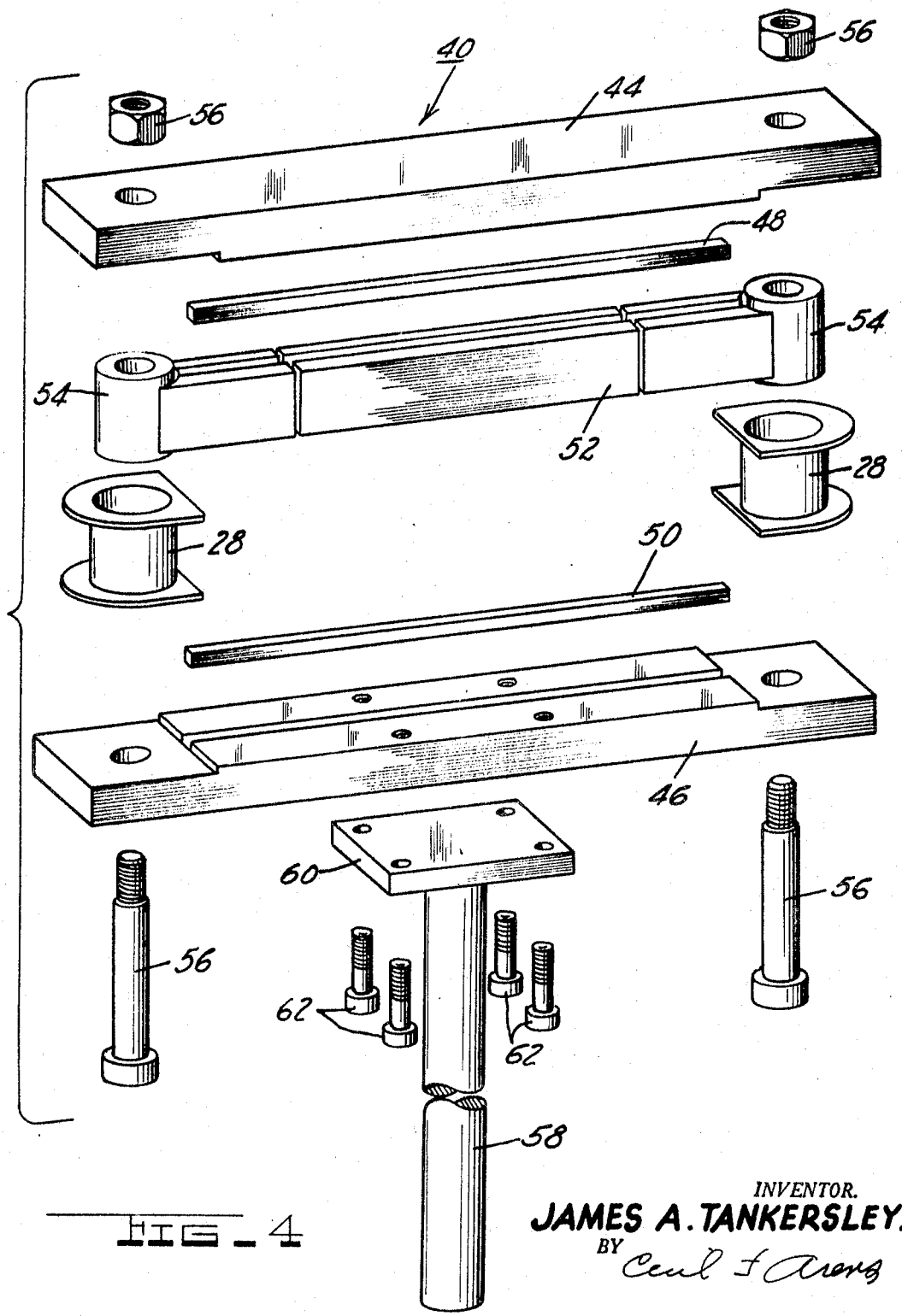
FIG_4

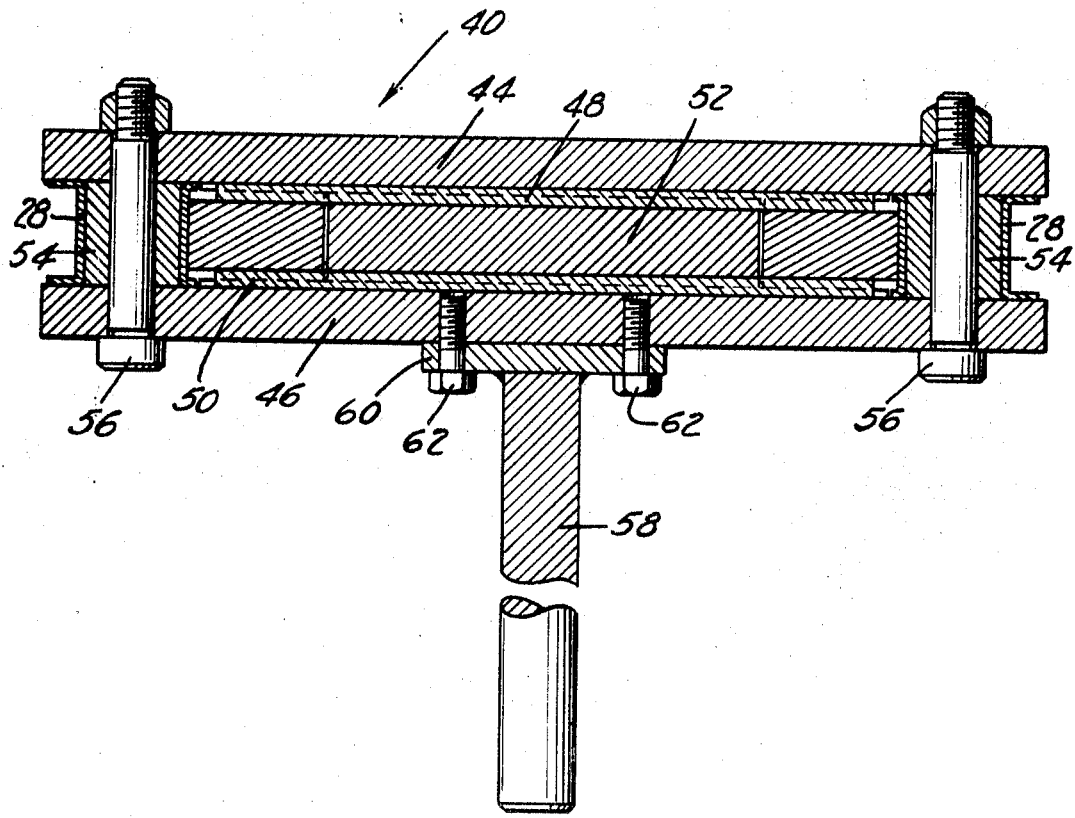

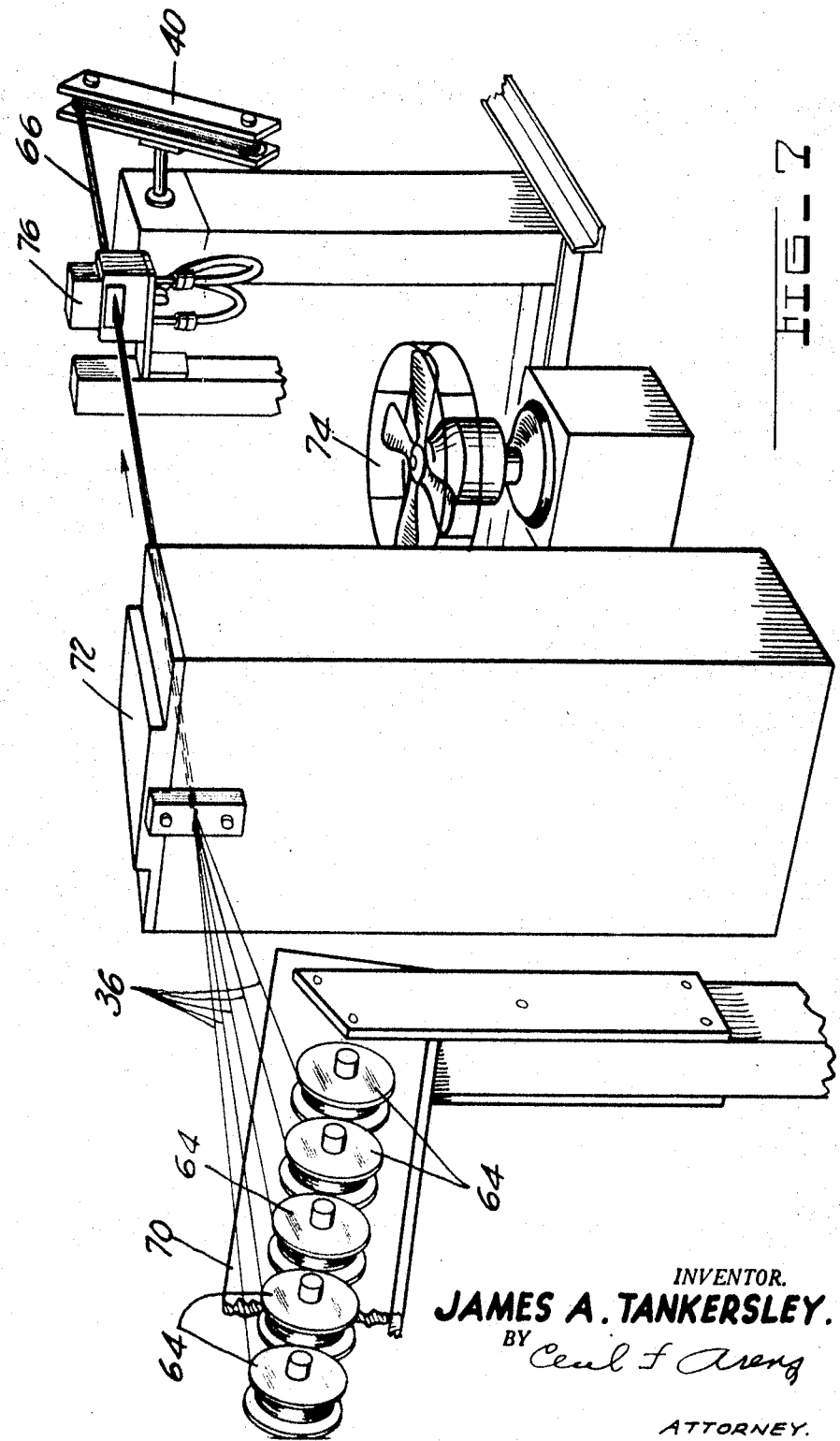

United States Patent Office 3,460,628
Patented Aug. 12, 1969

3,460,628
LAMINATED TENSION-TORSION TIE-BAR
James A. Tankersley, South Bend, Ind., assignor to The Bendix Corporation, South Bend, Ind., a corporation of Delaware
Filed Nov. 6, 1961, Ser. No. 150,455
Int. Cl. B64c *27/54;* F16d *3/58*
U.S. Cl. 170—160.58     7 Claims The present invention relates in general to a force transmitting member and, in particular, to a light-weight structural member capable of sustaining high tensile end loads while subjected to torsional oscillation about an axis in line with the application of said end load.

It has been the practice to make structures subjected to high tensile and torsional loading, such as, for example, the connecting members between helicopter rotor blades and their driving rotor, from a plurality of metal plates of substantial length and width. Such structures, particularly where used between helicopter blades and their driving rotor, have created numerous problems some of which are excessive weight, short operating life, maintenance and a lack of uniformity in manufacture.

In addition, the use of a plurality of metal strips necessitated minute inspection of the edges and in fact polishing thereof to insure that there were no nicks, scratches, burrs, etc. which due to rapidity of flexure would and have broadened into cracks that have led to rapid failure of the connecting plates or torsion straps, as they are most commonly called.

The prior art further suggests that such a connection between the rotor blades and the driving rotor or other similarly loaded structures be by the use of a solid bar sufficiently designed to resist the highest stresses imposed on the structures but which will elastically deform to provide torsional flexure. These bars too have presented weight problems plus an extensive manufacturing problem as well as a problem of limited selection of materials.

Accordingly, it is the object of this invention to eliminate the above-mentioned problems by providing a laminated tie-bar that will have sufficient tensile strength and torsional flexure without the creation of undue stresses by binding of any of the internal filaments within such composite structure and which, in addition, is capable of economic manufacture.

An important object of the present invention is to provide a force transmitting element that is structurally strong and highly resistant to fatigue in its operating environment.

A further object of the invention is to provide a method of laminating filaments into an endless tie-bar.

A still further object is to draw a plurality of filaments from freely rotatable spools and bind them in a parallel relationship to form a thin tape.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a perspective view of a helicopter rotor and blade assembly;

FIGURE 2 is a plan view of a helicopter rotor hub and blade connection employing a laminated tie-bar of the present invention;

FIGURE 3 is a partially sectioned perspective view of the preferred form of the laminated tie-bar of the subject invention;

FIGURE 4 is an exploded view with the parts in perspective showing the preferred fixture for wrapping the laminated tie-bar of the subject invention;

FIGURE 5 is a sectionalized view of the assembled fixture;

FIGURE 6 is a sectioned perspective view of the bushing and centering means therefor of the subject invention; and FIGURE 7 is a schematic of the preferred arrangement for making the subject invention.

One adaptation of the subject invention as mentioned briefly above is in the mounting of rotor blades to a hub of a helicoper rotor system in that such a system has need for a connecting means of tensile strength to resist centrifugal forces of a rotating blade while simultaneously permitting the blade to have varying pitch settings necessitating some degree of torsional flexibility, or a low torsional spring rate.

Referring now to the drawings and particularly to FIGURES 1 and 2, there is shown a helicopter rotor system 10 having a plurality of cylindrical rotor hub arms 12 rotatable about a spindle 14 on bearings 16 and 18 that are adapted to permit slight axial movement of the hub arms with respect to the spindle 14. The rotor hub arms 12 are held to a drag hinge 20 by a tie-bar 22 of the invention which is made of laminated filaments to be hereinafter described in further detail.

The tie-bar 22 is connected internally of the arm 12 and spindle 14 by pins or the like 24 and 26, respectively. The tie-bar 22 could be directly affixed to the pin connections 24 and 26 as by bonding it thereto with a resin substance such as that utilized in coating the filaments as will also be hereinafter described in further detail. Another means of attachment of said tie-bar 22 would be to provide collars on the pins 24 and 26. In any event the attachment is only limited by the necessity of transmitting all loadings on the structure to be attached by the tie-bar 22 to said tie-bar.

One form of connection providing the desired load transmission and allowing ready assembly and disassembly of the tie-bar 22 to the structure to be connected thereby, such as the arm 12 and spindle 14, was by bushings 28 which are adapted to receive the connecting pins 24 and 26 aforementioned. The bushings 28 have flanges 25 and 27 which serve to transmit torsional loading to the tie-bar 22 and also prescribe the height of the laminated tie-bar.

Thus, it may be readily appreciated that as the helicopter rotor blades 30 rotate, the centrifugal forces will create axial movement of the hub arm 12 with respect to the spindle 14 as aforementioned to tension the tie-bar 22; and, as the lift generated by said blades must be varied periodically during every 360° of revolution without regard to pitch changes induced by the pilot through the familiar swash plate 32 and links 34, the tie-bar 22 must undergo torsional flexure.

As best shown in FIGURE 3 the tie-bar 22 is formed from a plurality of filaments 36 which may have most any geometrical cross-section such as round or rectangular. An elastomeric substance 38 is utilized to bond the filaments 36 in a tape configuration as well as to enclose the laminated tie-bar assembly by a process to be hereinafter described in further detail.

The elastomeric substance should be chosen from resin compounds which possess tensile and torsional characteristics that resist separation of the filaments enclosed and bonded thereby. This is necessitated by the requirements and function of said substance as applied to the tie-bar 22 in that the filaments 36 must be separated from one another to prevent local stress build-up which would occur when one filament comes into contact with another; and, as the wires must be permitted to flex, the substance 38 must be deformable without exceeding the elastic limit. Thus various semi-solid compounds may be utilized for the substance 38 according to the operating environment of the tie-bar 22.

The filaments 36 and the coating substance 38 form a sheet or layer that is then wrapped around bushings 28 until a sufficient thickness is built-up to meet the specification set out by the particular environment in which the laminated tie-bar is to be utilized; i.e. to enable the tie-bar to withstand the maximum tensile and torsional loadings to which the structure connected thereby is subjected.

The equipment employed in connection with the process for manufacturing the tie-bar comprises a fixture 40 (see FIGURES 4 and 5) having an upper plate 44 and a lower plate 46 adapted to receive keys 48 and 50, respectively, for establishing alignment of a collapsible bar 52 centrally of the plates 44 and 46. The fixture 40 also holds the end connection means, such as the bushings 28, at the ends of the plates by cylindrical bushings 54, as seen in FIGURE 6, which also center the bushings 28 so that the collapsible bar 52 is faired into the walls of the bushings 28 and no wider at any point than the bushing diameter nor higher than the bushing dimension between the flanges. Further details as to the construction of this fixture show the plates 44 and 46 being thereafter joined by a fastener 56, which in this case is shown as a bolt and nut, and the fixture is mounted to a shaft 58 through a plate 60 by bolts 62, the shaft 58 being mounted for rotation to a power means (not shown).

Preparatory to wrapping of the laminated tie-bar about the bushings, the fixture 40 and all other surfaces that may come into contact with the wet elastomeric substance is coated with a parting agent which may take the form of a Teflon coating to insure removal of the tie-bar 22 after it is formed.

Thereafter, the filaments 36 are pulled off uniformly rotatable spools 64 having the ends thereof arranged in a parallel relationship and attached to one of the bushings 20 after being wrapped around the bushing part of one or more turns so that the ends of said filaments 36 are centrally located along the axis of said tie-bar 22 to prevent the lapping thereof by succeeding wraps of the tape 66.

With respect to manufacturing the laminated tie-bar, the fixture 40 containing the filaments is rotated drawing the filaments 36 off the uniformly rotatable spools 64 mounted on a rack 70. The number of spools 64 containing the filaments 36 is determined by the number of filaments required which in turn depends upon the desired tensile strength of the unit that is determined by the conditions of its operating environment. As seen in FIGURE 7 illustrating one arrangement of the method suggested by this invention, the rack 70 may be angularly disposed. However, the rack 70 may also assume other positions only limited by the fact that the filaments must emerge from the spools so that they will not become entangled with one another.

As the filaments 36 are drawn from the spools 64 they are gathered together at the entrance of a cleaning tank 72 and drawn through a vapor cleansing stream (not shown) within the tank 72 from which they emerge free of such impurities, as oil or the like, that would prevent binding of a resin thereto. The cleansed filaments are then drawn through a drying area subjected to forced air from a fan 74.

The filaments 36, which are now in a substantial parallel and horizontal alignment, are drawn through a resin tank 76 containing an elastomeric substance 38. This coats each filament and bonds them together in spaced relation, which relationship is determined by the amount of resin allowed to adhere to the filaments.

From the resin tank the tape 66 formed of the several filaments having the elastomeric substance 38 therebetween and therearound, which is as yet in a plastic state, is wrapped around the bushings 28 within the fixture 40 until a sufficient laminate thickness is reached to provide a unit of determined tensile and torsional strength.

When the desired thickness is built up, the coated and bonded tape is cut and clamped by a C clamp to the underlying layer until the resin has set enough to hold the end securely in position. Thereafter, the laminated tie-bar assembly is enclosed by an application of the aforementioned resin formed of an elastomeric substance, as by painting, dipping, etc., to provide a smooth outer contour which also affords protection in handling to the tie-bar assembly, and the resin coated laminated tie-bar 22 is then subjected to a cure process that involves allowing the enclosed belt assembly to set at room temperature or to place the belt assembly in an oven (not shown) to rapidly cure the elastomeric substance.

In one application of the present tie-bar to a helicopter rotor blade mounting system, the tie-bar was constructed of very thin circular cross-section wire filaments which due to the predicted blade loading had a tensile strength in excess of 600,000 p.s.i. and was bonded and spaced by a polyurethane compound having a tensile strength of 4,000 p.s.i., a modulus of 2,100 p.s.i. and a durometer of 80. In this environment the tie-bar withstood simultaneous tension and torsional loads producing combined stresses in excess of 500,000 p.s.i. Such a bar was fabricated according to the present invention with a forty per cent (40%) savings in weight over the presently used torsion straps operating in the same environment.

It is thus seen that a laminated filament structure has been prepared having high tensile strength qualities that is in fact only limited by the number of filaments and the thickness of the laminate which is also sufficiently flexible in a torsional sense to permit angular variation between the parts joined thereby, and these qualities are primarily due to the disposition of the filaments being such that their tensile resistance is additive and because they may flex without binding on each other to create deteriorating local stresses.

While one embodiment specifically has been shown herein and described, it is apparent that many changes and modifications may be made that lie within the scope of the invention. Therefore, I do not intend to be limited by the embodiment described herein, but only by the appended claims.

What is claimed is:

1. In a helicopter rotor system a rotor hub and blade connection comprising:
    a rotor hub spindle;
    a rotor hub arm on said spindle;
    a bearing means between said spindle and said arm;
    a rotor blade;
    a first means to mount said hub to said rotor system;
    a second means to mount said arm to said blade;
    a pair of bushings, one of which is operatively connected to said first means and the other of which is operatively connected to said second means;
    a lamination of a band of filaments including individual, parallel filaments each of which is coated with an elastomeric substance to separate and hold the parallel alignment of said filaments, said lamination being wrapped around and bonded to said bushings by said elastomeric substance to form an open-centered structural link between said first and second means to have axial strength and torsional resiliency in connecting said blade to said helicopter rotor system.

2. A rotor hub and blade connection in accordance with claim 1 wherein said filaments are characterized as a plurality of wire filaments.

3. A rotor hub and blade connection in accordance with claim 2 wherein said elastomeric substance is characterized as a polyurethane elastomeric substance.

4. In a connecting attachment for joining flexing structures subjected to high tensile stress, a tension-torsion tie-bar comprising:
    a pair of bushings having spaced, radially extending flanges;
    a lamination of a band of filaments including individual, elastomeric coated wires parallel to and spaced from one another by said elastomeric coating, which lamination consists of several layers of superimposed bands about and bonded to said bushings by said elastomeric coating between said flanges to form an annular structure having spaced parallel side portions and semicircular ends bonded to said bushings;

an electronic coating for said side portions and ends of said lamination which will provide a finished surface, said coating being applied to leave an open-centered annular structure having desirable weight and strength qualities; and a means to connect each of said bushings respectively to said flexing structures about the flexure axis of said tension-torsion tie-bar.

5. In a connecting attachment for joining flexing structures subjected to high tensile stress, a tension-torsion tie-bar comprising:

a pair of bushings having spaced, radially extending flanges;

a lamination of superimposed bands including individual wires held in a parallel, non-touching arrangement by a polyurethane composition, said lamination enclosing and bonded to said bushings by said polyurethane composition to form a solid link having semi-circular ends joined by spaced parallel side portions so as to have bidirectional axial strength and torsional resiliency about a longitudinal axis of said lamination; and a means to connect each of said bushings respectively to said flexing structures on said longitudinal axis.

6. In a helicopter rotor system, a rotor hub and blade connection comprising:

a rotor hub spindle;

a rotor hub arm on said spindle;

a bearing means between said spindle and said arm;

a rotor blade;

a first means to mount said hub to said rotor system;

a second means to mount said arm to said blade;

a pair of bushings one of which is operatively connected to said first means and the other of which is operatively connected to said second means;

a lamination of a band of filaments including individual, parallel filaments each of which is coated with an elastomeric substance to hold the parallel alignment of said filaments, said lamination being wrapped around and bonded to said bushings by said elastomeric substance to form between said first and second means a structural link having side portions which do not overlap adapted to have axial strength and torsional resiliency in connecting said blade to said helicopter rotor system.

7. In a connecting attachment for joining flexing structures subjected to high tensile stress, a tension-torsion tie bar comprising:

a pair of bushings having spaced radially extending flanges;

a lamination of superimposed bands including individual wires held in a parallel, non-touching arrangement by an adhesive composition, said lamination enclosing and bonded to said bushings by said adhesive composition to form a solid link having semi-circular ends joined by non-overlapping side portions which are parallel over a portion of their length so as to have bi-directional axial strength and torsional resiliency about a longitudinal axis of said lamination; and a means to connect each of said bushings respectively to said flexing structures on said longitudinal axis.

References Cited

UNITED STATES PATENTS

| | | | |
|---|---|---|---|
| 2,073,852 | 3/1937 | Radford | 64—12 |
| 2,443,239 | 6/1948 | Greenwood | 170—160.58 |
| 2,478,953 | 8/1949 | Tint | 64—12 |
| 2,530,520 | 11/1950 | Hackethal | 170—160.58 |
| 2,814,581 | 11/1957 | Flynn | 156—169 |
| 3,025,205 | 3/1962 | Young | 156—169 |
| 2,949,965 | 8/1960 | Detore | 170—160.5 |
| 3,026,942 | 3/1962 | Cresap | 170—160.5 |
| 2,369,876 | 2/1945 | Warren | 57—149 X |
| 2,961,051 | 11/1960 | Wilford et al. | 170—160.54 X |
| 2,983,305 | 5/1961 | Rasero. | |
| 2,992,469 | 7/1961 | Hose et al. | |
| 3,056,706 | 10/1962 | Knoppel | 150—169 X |
| 2,977,748 | 4/1961 | Zisman et al. | 57—149 |
| 3,080,268 | 5/1963 | Bjork | 156—173 X |
| 2,985,222 | 5/1963 | Marty et al. | 74—232 X |

FOREIGN PATENTS

| | | |
|---|---|---|
| 568,951 | 1/1924 | France. |
| 752,815 | 7/1956 | Great Britain. |
| 789,163 | 1/1958 | Great Britain. |

WENDELL E. BURNS, Primary Examiner

U.S. Cl. X.R.

57—149, 153; 64—12; 74—232; 156—169; 161—144; 170—160; 267—1; 287—79, 86